(12) United States Patent
Park

(10) Patent No.: US 12,252,036 B2
(45) Date of Patent: Mar. 18, 2025

(54) SYSTEM AND METHOD FOR HEATING BATTERY IN VEHICLE USING BIG DATA

(71) Applicants: HYUNDAI MOTOR COMPANY, Seoul (KR); KIA CORPORATION, Seoul (KR)

(72) Inventor: Hyun Soo Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 420 days.

(21) Appl. No.: 17/409,232

(22) Filed: Aug. 23, 2021

(65) Prior Publication Data

US 2022/0118883 A1 Apr. 21, 2022

(30) Foreign Application Priority Data

Oct. 20, 2020 (KR) ........................ 10-2020-0136240

(51) Int. Cl.
*B60L 58/00* (2019.01)
*B60L 58/12* (2019.01)
(Continued)

(52) U.S. Cl.
CPC ............... *B60L 58/27* (2019.02); *B60L 58/12* (2019.02); *G05D 23/1951* (2013.01); *G07C 5/008* (2013.01); *H01M 10/615* (2015.04); *H01M 10/625* (2015.04); *H01M 10/633* (2015.04); *H01M 10/635* (2015.04); (Continued)

(58) Field of Classification Search
CPC .... B60L 58/27; B60L 58/12; B60L 2240/545; B60L 2240/60; B60L 2240/662; B60L 2240/70; B60L 2240/80; H01M 10/615; H01M 10/625; H01M 10/633; (Continued)

(56) References Cited

U.S. PATENT DOCUMENTS 9,288,270 B1 3/2016 Penilla et al.
2010/0097036 A1 4/2010 Wakayama
(Continued)

FOREIGN PATENT DOCUMENTS

KR 10-2014-0077064 6/2014
KR 10-2016-0062620 6/2016
(Continued)

OTHER PUBLICATIONS

European Search Report issued Jan. 17, 2022 in corresponding European Patent Application No. 21185807.1.

*Primary Examiner* — Tiffany P Young
(74) *Attorney, Agent, or Firm* — Fox Rothschild LLP

(57) ABSTRACT

A system for heating a battery in a vehicle supplying driving power by a motor as a vehicle-driving source is provided. The system includes a big-data server configured to receive driving information of the vehicle and to determine an estimated driving start time of the vehicle and required output required at an initial driving stage of the vehicle based on the received driving information, and a controller, installed in the vehicle and configured to provide the driving information to the big-data server, to receive the estimated driving start time and the required output provided from the big-data server, and to derive a heating time of the battery, required to ensure the required output, based on the a temperature and an SoC of the battery installed in the vehicle.

16 Claims, 3 Drawing Sheets

(51) Int. Cl.
  *B60L 58/27* (2019.01)
  *G05D 23/19* (2006.01)
  *G07C 5/00* (2006.01)
  *H01M 10/00* (2006.01)
  *H01M 10/615* (2014.01)
  *H01M 10/625* (2014.01)
  *H01M 10/633* (2014.01)
  *H01M 10/635* (2014.01)

(52) U.S. Cl.
  CPC ..... *B60L 2240/545* (2013.01); *B60L 2240/60* (2013.01); *B60L 2240/662* (2013.01); *B60L 2240/70* (2013.01); *B60L 2240/80* (2013.01); *H01M 2220/20* (2013.01)

(58) Field of Classification Search
  CPC ............ H01M 10/635; H01M 2220/20; G05D 23/1951; G07C 5/008
  USPC ........................................................... 701/2
  See application file for complete search history.

(56) References Cited

U.S. PATENT DOCUMENTS

2016/0059733 A1\* 3/2016 Hettrich .................. B60L 58/27
  701/2
2020/0055406 A1\* 2/2020 Vallender ................ B60L 58/12
2020/0164763 A1  5/2020 Holme
2021/0323442 A1\* 10/2021 Wu .......................... B60L 3/12

FOREIGN PATENT DOCUMENTS

KR  10-2016-0148938  12/2016
KR  10-2019-0004138  1/2019

\* cited by examiner

SYSTEM AND METHOD FOR HEATING BATTERY IN VEHICLE USING BIG DATA

CROSS REFERENCE TO RELATED APPLICATION

The present application claims priority to and the benefit of Korean Patent Application No. 10-2020-0136240, filed on Oct. 20, 2020, the entire contents of which are incorporated herein for all purposes by this reference.

TECHNICAL FIELD

The present disclosure relates to a system and method for heating a battery in a vehicle using big data, and more particularly to a system and method for heating a battery in a vehicle using big data, which heat the battery in the vehicle before the vehicle starts traveling according to a driving pattern of the vehicle using big data established through a big-data server.

BACKGROUND

In general, an eco-friendly vehicle produces power by driving a motor using electric energy stored in a battery. In particular, a pure electric vehicle, among the kinds of eco-friendly vehicles is capable of traveling using only a motor driven using power provided from a battery, and thus, it is very important to appropriately manage the battery and to maintain the battery in an appropriate state in order to improve the performance of a vehicle.

In particular, it is required to maintain the battery at an appropriate temperature in order to properly maintain the performance of the electric vehicle. It is difficult for a battery to output enough power to drive a vehicle in a low temperature range, and thus, a battery that is cooled while parked during the winter season needs to be heated to a temperature at which power is smoothly output at least before the vehicle is turned on.

Various methods of heating a battery are known in the art to which the present disclosure pertains, and a method of heating a battery by driving a heater using a heating line, a heating element, or the like, which is installed to surround the battery, has been mainly employed.

Conventionally, a method of heating a battery to a predetermined temperature or greater by periodically waking up a controller while a vehicle is parked and a method in which a driver inputs the time at which it is desired to start driving a vehicle in advance and a controller heats a battery by the input time have been applied in order to improve the performance of the electric vehicle during the winter season.

In the method of heating the battery by periodically waking up the controller, even if the vehicle is parked for a long time and does not travel for a long time, the battery is periodically heated, and thus there is a problem in that energy is unnecessarily wasted to heat the battery.

In the method of inputting the time at which it is desired to start driving a vehicle by the driver, the driver needs to input the time at which it is desired to start driving a vehicle, and thus when the vehicle needs to be started quickly before the estimated time is reached or when the driver forgets to input the estimated time, there is a problem in that the battery is not heated.

The contents described as the related art have been provided only to assist in understanding the background of the present disclosure and should not be considered as corresponding to the related art known to those having ordinary skill in the art.

SUMMARY

The present disclosure provides a system and method for heating a battery in a vehicle using big data for heating the battery in the vehicle in a desirable state before the vehicle starts traveling according to a driving pattern of the vehicle using big data even if there is no separate driver input.

In one form of the present disclosure, a system for heating a battery in a vehicle supplying driving power by a motor as a vehicle-driving source, using big data includes a big-data server configured to receive driving information of the vehicle, and to determine an estimated driving start time of the vehicle and a required output required at an initial driving stage of the vehicle based on the received driving information, and a controller installed in the vehicle and configured to provide the driving information to the big-data server, to receive the estimated driving start time and the required output provided from the big-data server, and to derive a heating time of the battery, required to ensure the required output, based on a temperature and a state of charge (SoC) of the battery installed in the vehicle.

The big-data server may receive a driving start time of the vehicle, driving power for driving the motor while driving the vehicle, and the SoC of the battery while driving the vehicle, as the driving information.

The big-data server may accumulate the driving information and derive a pattern for each day of the week at the driving start time of the vehicle, a driving power variation pattern while driving the vehicle, and an SoC variation pattern of the battery while driving the vehicle.

The big-data server may derive the estimated driving start time based on the pattern for each day of the week at the driving start time of the vehicle, and may derive the required output based on the driving power variation pattern and the SoC variation pattern.

The controller may be woken up earlier than the estimated driving start time by as much as a preset time, and the preset time may correspond to a maximum heating time taken to heat the battery to the maximum.

The controller may calculate a required heating temperature at which the battery is capable of outputting the required output based on a battery output map for each preset temperature-battery SoC.

The controller may extract a heating target temperature corresponding to the SoC of the battery and the required output in a battery output map for each temperature-battery SoC and may calculate the required heating temperature by subtracting a measured temperature of the battery from the heating target temperature.

The controller may derive a driving time of a heater, corresponding to a measured value of an outdoor temperature of the vehicle and the required heating temperature, in a battery temperature increase data map dependent upon a preset outdoor temperature and the driving time of the heater, and may determine the derived driving time of the heater as a heating time of the battery.

In one form of the present disclosure, a method of heating a battery in a vehicle supplying driving power by a motor as a vehicle-driving source, using big data includes providing driving information of the vehicle to a big-data server, by a controller of the vehicle, receiving the driving information of the vehicle and determining an estimated driving start time of the vehicle and a required output required at an initial driving stage of the vehicle based on the received driving information, by the big-data server, and receiving the estimated driving start time and the required output, determined by the big-data server, and deriving a heating time of the battery, required to ensure the required output, based on a temperature and a state of charge (SoC) of the battery installed in the vehicle, by the controller.

The determining may include receiving a driving start time of the vehicle, driving power for driving the motor while driving the vehicle, and the SoC of the battery while driving the vehicle, as the driving information, and accumulating the driving information and deriving a pattern for each day of the week at the driving start time of the vehicle, a driving power variation pattern while driving the vehicle, and an SoC variation pattern of the battery while driving the vehicle, by the big-data server, and deriving the estimated driving start time based on the pattern for each day of the week at the driving start time of the vehicle, deriving the required output based on the driving power variation pattern and the SoC variation pattern, and transmitting the required output to the controller, by the big-data server.

The determining may include waking up the controller earlier than the estimated driving start time by as much as a preset time corresponding to a maximum heating time taken to heat the battery to the maximum.

The determining may include calculating a required heating temperature at which the battery is capable of outputting the required output based on a battery output map for each preset temperature-battery SoC, by the controller, and deriving the heating time of the battery based on a battery temperature increase data map dependent upon a preset outdoor temperature and a driving time of the heater.

The calculating the required heating temperature may include extracting a heating target temperature corresponding to the SoC of the battery and the required output in a battery output map for each temperature-battery SoC and calculating the required heating temperature by subtracting a measured temperature of the battery from the heating target temperature, by the controller.

The deriving the heating time may include deriving a driving time of a heater, corresponding to a measured value of an outdoor temperature and the required heating temperature, in a battery temperature increase data map dependent upon the outdoor temperature and the driving time of the heater and determining the derived driving time of the heater as a heating time of the battery.

DRAWINGS

DETAILED DESCRIPTION

Hereinafter, a system and method for heating a battery in a vehicle using big data according to exemplary embodiments of the present disclosure will be described in detail with reference to the attached drawings.

Figure 1:
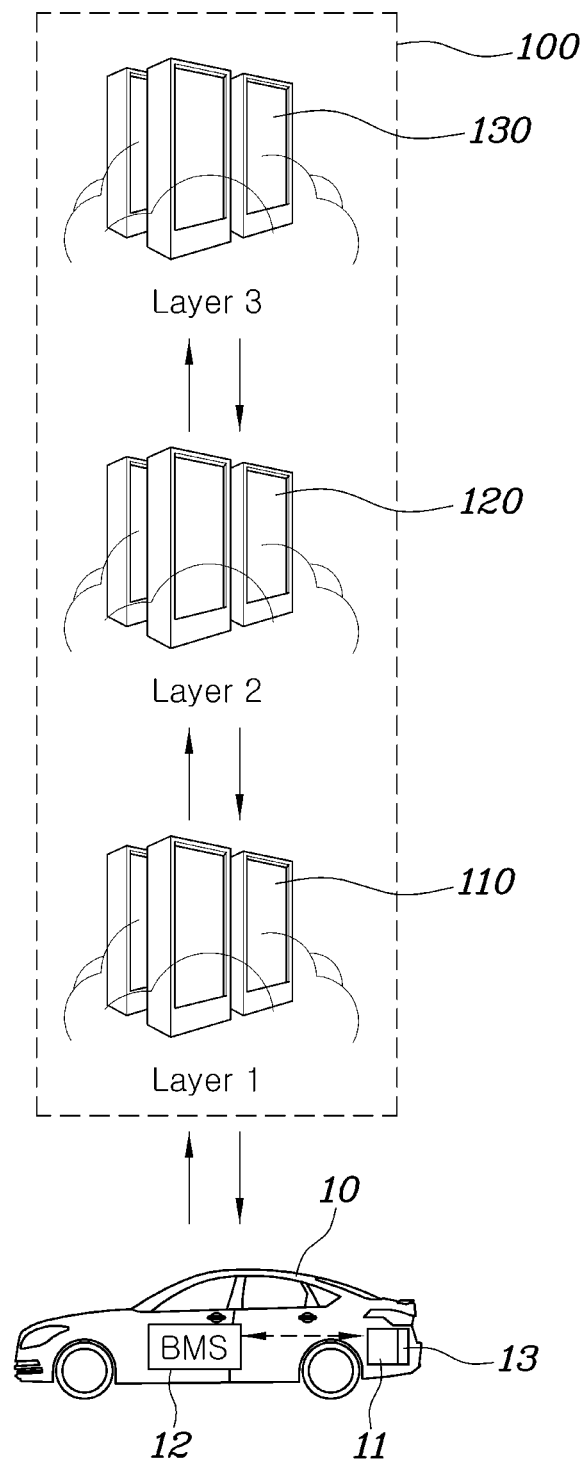
FIG. 1 is a diagram showing the configuration of a system for heating a battery in a vehicle using big data in one form of the present disclosure.

FIG. 1 is a diagram showing the configuration of a system for heating a battery in a vehicle using big data in some forms of the present disclosure.

Referring to FIG. 1, the system for heating a battery in a vehicle using big data according to an embodiment of the present disclosure may include a big-data server 100 configured to receive driving information of a vehicle from a vehicle 10 and to derive an estimated driving start time of the vehicle 10 and a required output (or a required power) that is required at an initial driving stage of the vehicle 10 based on the received driving information, and a controller 12 that is installed in the vehicle 10 and is configured to receive the estimated driving start time and the required output provided from the big-data server 100 and to calculate a heating time of the battery, required to ensure the required output, based on a temperature and a state of charge (SoC) of a battery 11 installed in the vehicle 10 by being woken up prior to the estimated driving start time.

The big-data server 100 may receive driving information of a vehicle related to heating of the battery 11 in a vehicle from the vehicle 10 and may generate and store data obtained by processing and analyzing the received driving information of the vehicle.

In particular, according to an embodiment of the present disclosure, the big-data server 100 may receive driving information such as the driving start time of the vehicle 10, driving power for driving a motor while driving the vehicle 10, and a state of charge (SoC) of the battery 11 of the vehicle 10 from the controller 12 of the vehicle.

The big-data server 100 may generate various patterns related to driving of the vehicle 10 by accumulating the driving information of the vehicle received from the controller 12 of the vehicle 10, and may then transmit the patterns to the controller 12 of the vehicle 10 if necessary.

For example, the big-data server 100 may accumulate and receive the driving start time of the vehicle and may derive an estimated driving start time for each day of the week. When the vehicle 10 is used by a driver for commuting, the driving start time of the vehicle may have a predetermined pattern for each day of the week, and the big-data server 100 may derive the estimated driving start time of the vehicle 10 for each day of the week based on the pattern of the driving start time.

In another example, the big-data server 100 may derive a driving power pattern and an SoC pattern of the vehicle 10 by receiving and accumulating information on the driving power and the SoC of the vehicle 10. The big-data server 100 may determine the required output of the vehicle based on the driving power pattern and the SoC pattern.

Here, the required output needs to be received from a battery in order to drive the vehicle, may be determined according to the driving pattern of the vehicle, and may be a reference for calculating a temperature to which it is required to heat the battery by the controller 12 of the vehicle 10.

In more detail, when the driver of the vehicle 10 has a driving tendency such that the driver enjoys rapid launch and acceleration while driving the vehicle, the big-data server 100 may infer that the corresponding vehicle has a driving power pattern using high driving power. In addition, when the driver has a driving tendency such that the battery is rapidly charged and discharged greatly while driving the vehicle, the big-data server 100 may infer that the vehicle has a charging pattern in which the SoC of the battery is greatly changed while driving the vehicle.

The big-data server 100 may derive the required output that is required at an initial driving stage of the vehicle based on such a driving power pattern and an SoC variation pattern of the battery. For example, the big-data server 100 may determine high required output for a vehicle having a pattern using high driving power compared with a vehicle in the opposite case. This is because a vehicle that uses high driving power from an initial driving stage needs to heat a battery sufficiently and to smoothly provide power.

In addition, the big-data server 100 may determine low required output for a vehicle having a pattern in which the SoC of a battery varies greatly while driving the vehicle compared with a vehicle in the opposite case. This is because the battery of the vehicle having the pattern in which the SoC of the battery varies greatly while driving the vehicle is rapidly heated by the heat generated from the battery itself due to charging and discharging of the battery while driving the vehicle, even if the temperature of the battery is low at an initial driving stage.

The required output determined by the big-data server 100 may refer to the power that needs to be output by the battery when the vehicle starts driving in consideration of the driving power of the vehicle and the SoC of the battery 11 in the vehicle. The required output may correspond to the minimum power for stably driving the vehicle based on the driving pattern of the vehicle, but not the maximum power to be output from the battery. The big-data server 100 may determine the minimum required output required to drive the vehicle at an initial driving stage in consideration of heat generated by the battery itself while driving the vehicle based on the driving power pattern of the vehicle 10 and the SoC variation pattern of the battery in the vehicle.

As such, according to an embodiment of the present disclosure, the battery may be heated only up to the minimum at an initial driving stage of the vehicle by determining the minimum required output while driving the vehicle based on the driving pattern of the vehicle 10 when the required output, as a reference for heating the battery is determined. Thus, according to an embodiment of the present disclosure, power consumption in a heater for heating the battery may be reduced by preventing the battery 11 from being excessively heated. In particular, power consumed to heat the battery may be further saved by calculating the required output in consideration of heating of the battery using heat generated by the battery itself through charging and discharging of the battery while driving the vehicle using the SoC variation pattern of the battery while driving the vehicle.

The big-data server 100 and the controller 12 of the vehicle 10 may be embodied as a communication device that supports various wireless communication protocols that are known to the art to which the art pertains. The detailed communication method is not related to the main features of the present disclosure, and thus, a detailed description thereof will be omitted.

As shown in FIG. 1, the big-data server 100 may be embodied using a distributed cloud method of a hierarchical structure having cloud servers 110, 120, and 130 for respective layers.

For example, the first-layer cloud server 110, belonging to the lowermost layer of a plurality of hierarchical structures, may communicate with the vehicle 10, may log data generated by the vehicle 10 in real time, and may provide the logged data to the vehicle 10 if necessary, or may provide the data to the cloud servers 120 and 130 belonging to a high-ranking layer of the lowermost layer 110.

The first-layer cloud server 110 may log raw data generated by a vehicle in real time via communication with the vehicle. The first-layer cloud server 110 may log and store vehicle data at as low a sampling rate as possible without data loss. The first-layer cloud server 110 may set a limit on the amount of data to be logged and stored per vehicle, that is, the communication target. Needless to say, if resources allow, all data logged from a vehicle may be stored, but the first-layer cloud server 110 communicates with and controls the vehicle mainly in real time, and thus the amount of data to be stored per vehicle may be limited in order to use resources efficiently.

The raw data logged by the first-layer cloud server 110 may be data that is generated and transmitted by various controllers of a vehicle. In particular, in the system for controlling heating of a battery according to the present disclosure, the first-layer cloud server 110 may receive information such as the time for starting driving the vehicle 10, driving power while driving the vehicle 10, and the SoC of the battery while driving the vehicle 10, from the controller 12 of the vehicle 10.

The second-layer cloud server 120 may receive information collected by the first-layer cloud server 110 and may accumulate and store the data, and the third-layer cloud server 130 may derive a predetermined pattern by analyzing the accumulated data using a statistical method and may determine data transmitted to the controller 12 of the vehicle 10 in order to heat the battery based on the derived pattern. That is, the third-layer cloud server 130 may determine an estimated driving start time of the vehicle for each day of the week and the required output required while driving the vehicle, and may transmit the estimated driving start time and the required output to the controller 12 of the vehicle 10.

FIG. 1 is a diagram for explaining an example of an embodiment in which a total of three layers is embodied, in which case the number of layers may be appropriately adjusted as necessary and the function performed by each layer may also be appropriately changed.

The controller 12 of the vehicle 10 may receive the estimated driving start time and the required output from the big-data server 100, and may control heating of the battery by driving a heater 13 added to the battery 11 based on the received estimated driving start time and required output.

The scheme for controlling heating of the battery performed by the controller 12 will be more clearly understood through a method of heating a battery in a vehicle using big data according to an embodiment of the present disclosure, which will be described below.

Figure 2:
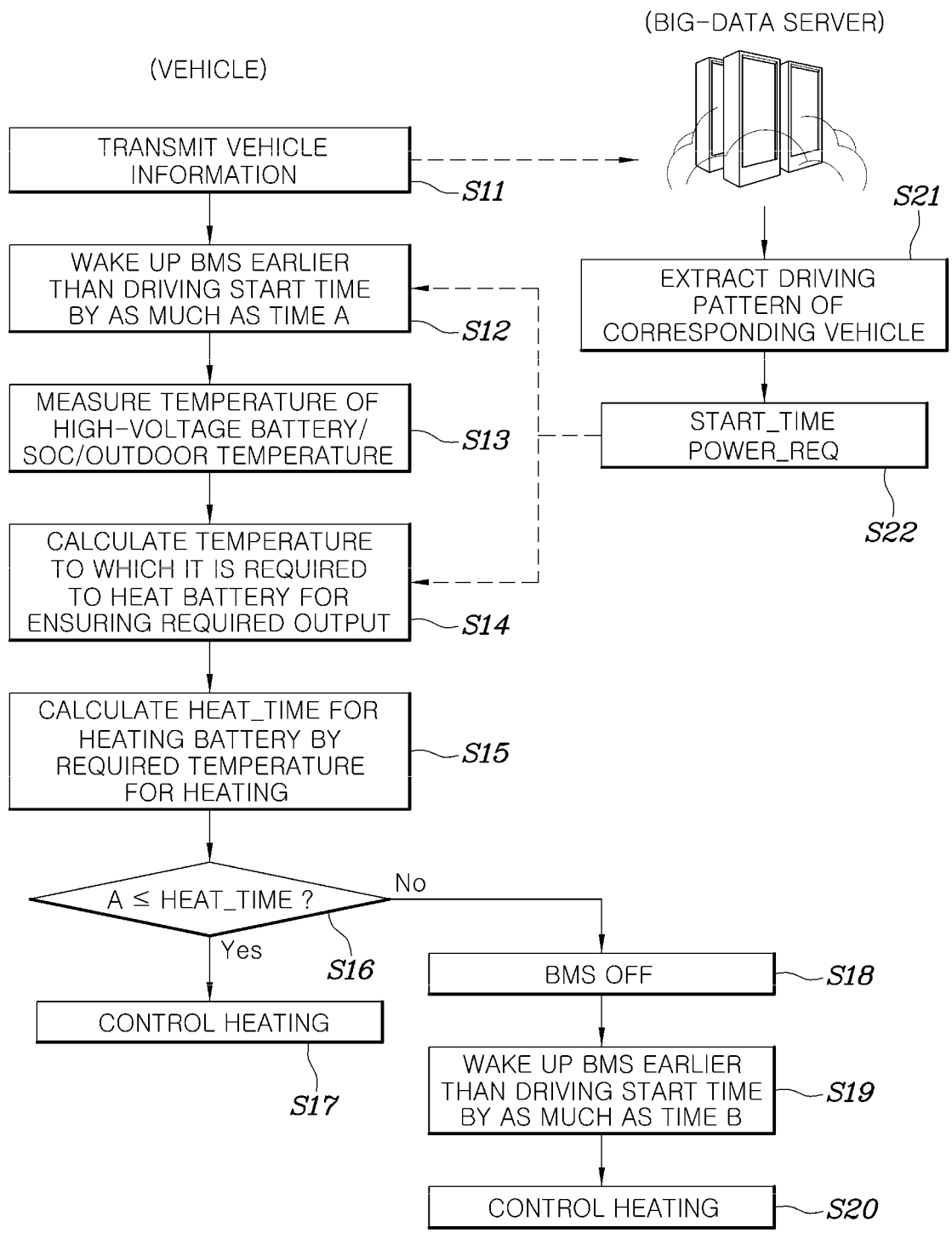
FIG. 2 is a flowchart showing a method of heating a battery in a vehicle using big data in one form of the present disclosure.

FIG. 2 is a flowchart showing a method of heating a battery in a vehicle using big data in some forms of the present disclosure.

The controller 12 of the vehicle 10 may transmit information required by the big-data server 100 in real time at a predetermined period in order to control heating of the battery while driving the vehicle (S11). As described above, information transmitted to the big-data server 100 by the controller 12 with regard to control of heating the battery may include the driving start time of the vehicle, driving power while driving the vehicle, and the SoC of the battery while driving the vehicle.

The big-data server 100 may accumulate the information provided from the vehicle, may generate a driving pattern of the corresponding vehicle (S21), may determine the estimated driving start time and the required output at an initial driving stage while driving the vehicle based on the generated driving pattern, and may transmit the determined estimated driving start time and required output to the corresponding vehicle (S22).

The controller 12 of the vehicle 10 may be woken up earlier than the estimated driving start time of the vehicle, provided from the big-data server 100, by as much as a time A hours (S12) and may collect information required to control heating of the battery (S13).

Here, a value A may be determined in consideration of the case in which a battery needs to be heated at the lowest temperature for the maximum heating time. That is, the value A may be a value corresponding to a preset maximum heating time in order to maximally heat the battery.

Information required to control heating of the battery may include a temperature of the battery, an outdoor temperature of the vehicle, and the SoC of the battery. The temperature of the battery and the outdoor temperature may be detected by a temperature sensor installed in the battery and a temperature sensor for detecting an outdoor temperature of the vehicle, and the SoC of the battery 11 may be executed through an algorithm for determining the SoC of the battery, which is pre-stored in the controller 12. The sensor or the algorithm is already known to the art to which the present disclosure pertains, and thus, a detailed description thereof will be omitted.

Then, the controller 12 may calculate the temperature to which it is required to heat the battery 11 for ensuring the required output provided from the big-data server 100 based on a battery output map for each preset temperature-battery SoC (S14).

Figure 3:
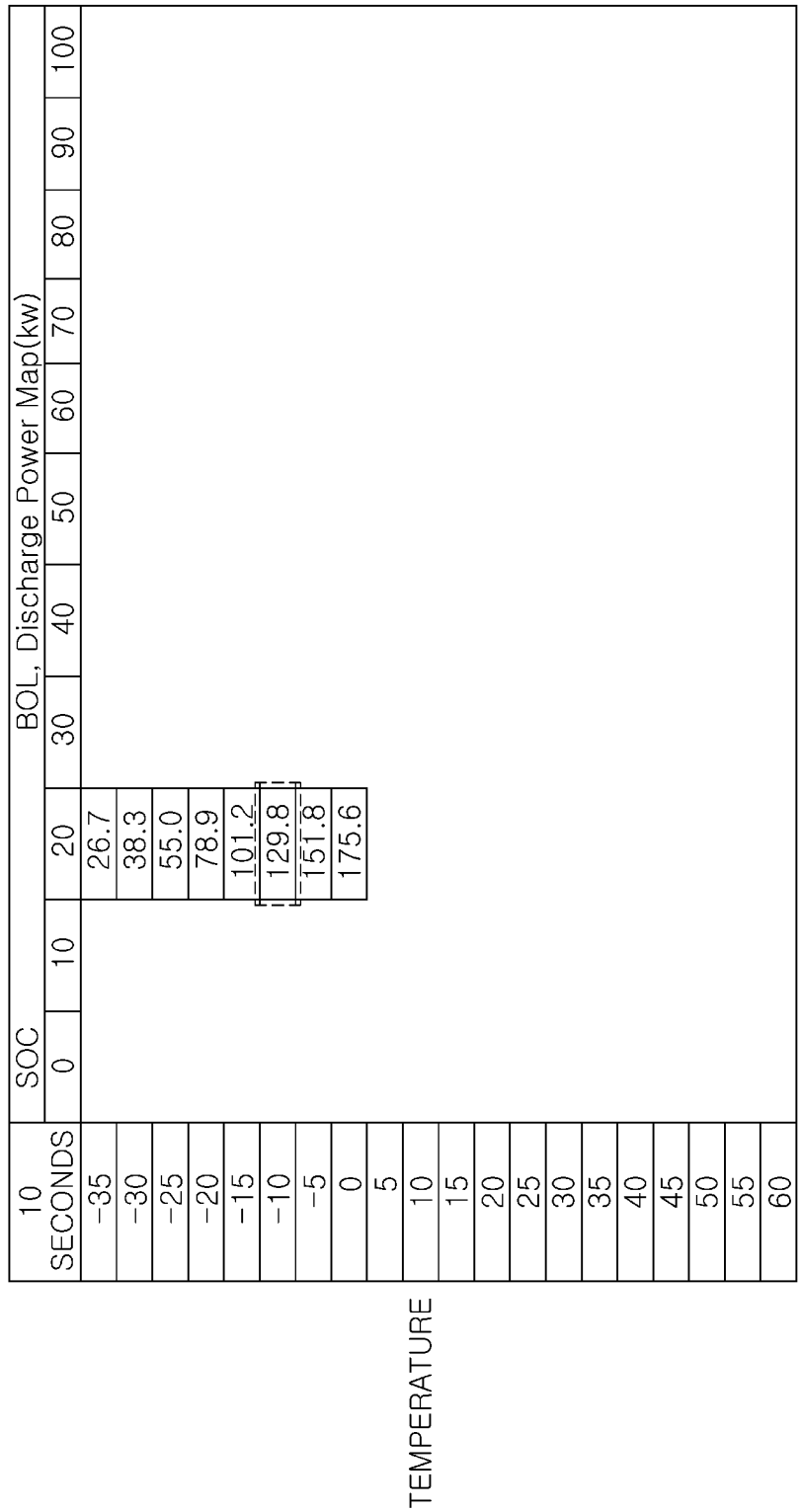
FIG. 3 is a diagram showing an example of a battery output map for each temperature-state of charge (SoC) applied to calculate the temperature to which it is required to heat the battery in a system and method for heating a battery in a vehicle using big data in one form of the present disclosure.

FIG. 3 is a diagram showing an example of a battery output map for each temperature-SoC applied to calculate the temperature to which it is required to heat the battery in a system and method for heating a battery in a vehicle using big data in some forms of the present disclosure.

In operation S14, the controller 12 may calculate the temperature to which it is required to heat the battery using the battery output map for each temperature-SoC shown in FIG. 3.

An example in which the required output provided from the big-data server 100 is 120 kW, the outdoor temperature and the temperature of the battery are −20° C., and the battery SoC is 20% will be described below. Referring to the map shown in FIG. 3, when the SoC of the battery is 20% and the battery temperature is −20° C., the output of the battery may be 78.9. Referring to the map shown in FIG. 3, when the SoC of the battery is 20%, the battery needs to be heated at least to a temperature between 10 and 15° C. in order to achieve output of 120 kW by a battery. An accurate heating target temperature may be calculated through interpolation between temperatures, or may also be set to a temperature equal to or greater than the required output.

The controller 12 may calculate a required heating temperature, to which it is required to heat the battery, as a temperature of about 15° C. by subtracting the current temperature of the battery from the heating target temperature. In this example, when the battery is heated by about 5° C., the battery at the SoC of 20% may be capable of outputting an output equal to or greater than 120 kW, and thus the required heating temperature may be determined to be about 5° C.

Then, the controller 12 may derive the heating time taken to heat the battery 11 by the required heating temperature (S15). The time taken to heat the battery 11 may be changed depending on a heating value of the heater 13 and the outdoor temperature. According to an embodiment of the present disclosure, the heating time may be determined using a battery temperature increase data map, which is dependent upon the outdoor temperature, and the driving time of the heater 13 in consideration of the heating value of the heater 13. That is, the controller 12 may determine the driving time of the heater 13, corresponding to the required heating temperature and the current outdoor temperature in the battery temperature increase data map, as the time taken for heating.

Then, when a heating time Heat time is equal to or greater than a time A (which is the time remaining until the estimated driving start time of the vehicle from the time at which the controller 12 is woken up) (S16), the controller 12 may immediately drive the heater 13 to control heating of the battery (S17), and when the heating time Heat time is shorter than the time A, power is turned off (S19), and then the controller 12 may be earlier woken up by as much as a time B corresponding to the heating time from the estimated driving start time (S19) and may control heating of the battery (S20).

As described above, the system and method for heating a battery in a vehicle using big data according to various embodiments of the present disclosure may calculate minimum/optimum power required by the battery at an initial driving stage of the vehicle and may prevent the battery from being heated more than necessary in consideration of the fact that the required output is different for each driver depending on their driving pattern/tendency and the fact that the battery is heated through charging and discharge while driving the vehicle rather than being heated using the heater of the battery. Accordingly, the energy efficiency of the vehicle may be improved by minimizing energy consumption of the battery of the vehicle.

The system and method for heating a battery in a vehicle using big data may calculate minimum/optimum power required by the battery at an initial driving stage of the vehicle and may prevent the battery from being heated more than necessary in consideration of the fact that the required output is different for each driver depending on their driving pattern/tendency and the fact that the battery is heated through charging and discharge while driving the vehicle rather than being heated using the heater of the battery. Accordingly, the driver input for heating the battery before the vehicle starts traveling may not be required, and the energy efficiency of the vehicle may be improved by minimizing energy consumption of the battery of the vehicle when heating the battery.

It will be appreciated by those skilled in the art that the effects achievable through the present disclosure are not limited to those that have been particularly described hereinabove and that other unmentioned effects of the present disclosure will be more clearly understood from the above detailed description.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A system for heating a battery in a vehicle supplying driving power by a motor as a vehicle-driving source, the system comprising:
    a server configured to:
        receive driving information of the vehicle; and
        determine an estimated driving start time of the vehicle and a required power output of a battery required at an initial driving stage of the vehicle based on the received driving information; and
a controller installed in the vehicle and configured to:
provide the driving information to the server;
receive the estimated driving start time and the required power output of the battery from the server;
activate earlier than the estimated drying start time a preset time, the preset time corresponding to a maximum heating time required to heat the battery to the maximum; and
derive a heating time of the battery after activating, required to ensure the required power output of the battery, based on a temperature and a state of charge (SoC) of the battery installed in the vehicle;
wherein deriving the heating time comprises:
calculating a required heating temperature based on the temperature and the SoC of the battery; and
deriving a driving time of the heater based on the required heating temperature and a measured value of an outdoor temperature of the vehicle.

2. The system of claim 1, wherein the server is configured to:
receive a driving start time of the vehicle, driving power for driving the motor while driving the vehicle, and the SoC of the battery while driving the vehicle, as the driving information.

3. The system of claim 2, wherein the server is configured to:
accumulate the driving information; and
derive a pattern for each day of the week at the driving start time of the vehicle, a driving power variation pattern while driving the vehicle, and an SoC variation pattern of the battery while driving the vehicle.

4. The system of claim 3, wherein the server is configured to:
derive the estimated driving start time based on the pattern for each day of the week at the driving start time of the vehicle; and
derive the required power output of the battery based on the driving power variation pattern and the SoC variation pattern.

5. The system of claim 1, wherein the controller is configured to:
calculate the required heating temperature at which the battery is capable of outputting the required power output of the battery based on a battery output map for each preset temperature-battery SoC.

6. The system of claim 5, wherein the controller is configured to:
extract a heating target temperature corresponding to the SoC of the battery and the required power output of the battery in a battery output map for each preset temperature-battery SoC; and
calculate the required heating temperature by subtracting a measured temperature of the battery from the heating target temperature.

7. The system of claim 1, wherein the controller is configured to:
derive the driving time of the heater, corresponding to the measured value of the outdoor temperature of the vehicle and the required heating temperature, in a battery temperature data map based on a preset outdoor temperature and the driving time of the heater; and
determine that the derived driving time of the heater is a heating time of the battery.

8. The system of claim 1, wherein the controller is further configured to:
compare the heating time and time A, the time A being time remaining until the estimated driving start time of the vehicle from the time at which the controller is activated; and
drive the heater to control heating of the battery when the heating time is equal to or greater than the time A.

9. The system of claim 8, wherein the controller is further configured to:
turn off a power when the heating time is shorter than the time A;
earlier activate by as much as a time B corresponding to the heating time from the estimated driving start time; and
control heating of the battery after activating.

10. A method of heating a battery in a vehicle supplying driving power by a motor as a vehicle-driving source, the method comprising:
providing, by a controller, driving information of the vehicle to a server;
receiving, by the server, the driving information of the vehicle and determining an estimated driving start time of the vehicle and a required power output of a battery required at an initial driving stage of the vehicle based on the received driving information;
receiving, by the controller, the estimated driving start time and the required power output of the battery;
activating, by the controller, earlier than the estimated driving start time by a preset time corresponding to a maximum heating time required to heat the battery to the maximum; and
deriving, by the controller, a heating time of the battery after activating, required to ensure the required power output of the vehicle, based on a temperature and a state of charge (SoC) of the battery installed in the vehicle;
wherein deriving the heating time comprises
calculating a required heating temperature based on the temperature and the SoC of the battery; and
deriving a driving time of the heater based on the required heating temperature and a measured value of an outdoor temperature of the vehicle.

11. The method of claim 10, wherein determining the estimated driving start time comprises:
receiving a driving start time of the vehicle, driving power for driving the motor while driving the vehicle, and the SoC of the battery while driving the vehicle, as the driving information;
accumulating the driving information and deriving a pattern for each day of the week at the driving start time of the vehicle, a driving power variation pattern while driving the vehicle, and an SoC variation pattern of the battery while driving the vehicle;
deriving the estimated driving start time based on the pattern for each day of the week at the driving start time of the vehicle;
deriving the required power output of the battery based on the driving power variation pattern and the SoC variation pattern; and
transmitting the required power output of the battery to the controller.

12. The method of claim 10, wherein determining the estimated driving start time comprises:
calculating a required heating temperature at which the battery is capable of outputting the required power output of the battery based on a battery output map for each preset temperature-battery SoC; and deriving the heating time of the battery based on a battery temperature data map based on a preset outdoor temperature and a driving time of the heater.

13. The method of claim 12, wherein calculating the required heating temperature comprises:
    extracting a heating target temperature corresponding to the SoC of the battery and the required power output of a battery in a battery output map for each temperature-battery SoC; and
    calculating the required heating temperature by subtracting a measured temperature of the battery from the heating target temperature.

14. The method of claim 12, wherein deriving the heating time comprises:
    deriving the driving time of the heater, corresponding to the measured value of the outdoor temperature and the required heating temperature, in a battery temperature data map based on the outdoor temperature and the driving time of the heater; and
    determining that the derived driving time of the heater is a heating time of the battery.

15. The method of claim 10, further comprising:
comparing, by the controller, the heating time and time A, the time A being time remaining until the estimated driving start time of the vehicle from the time at which the controller is activated; and
driving, by the controller, the heater to control heating of the battery when the heating time is equal to or greater than the time A.

16. The method of claim 15, further comprising:
turning, by the controller, off a power when the heating time is shorter than the time A;
earlier activating, by the controller, by as much as a time B corresponding to the heating time from the estimated driving start time; and
controlling, by the controller, heating of the battery after activating.

* * * * *